Figure 1:
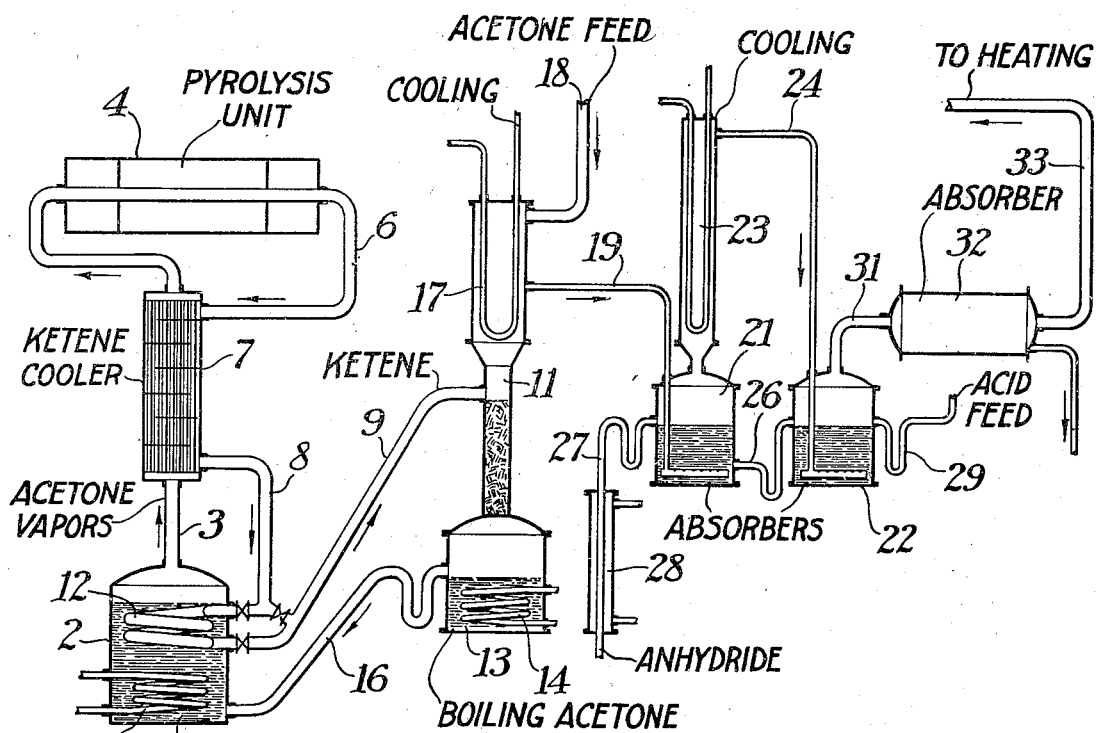

Oct. 14, 1941.  F. J. HOPKINSON  2,258,985
PROCESS FOR THE MANUFACTURE OF KETENE
Filed Jan. 5, 1937  2 Sheets-Sheet 1

Frederick J. Hopkinson
INVENTOR.
BY Newton M. Perriss
Daniel J. Mayne
ATTORNEYS

Oct. 14, 1941.   F. J. HOPKINSON   2,258,985
PROCESS FOR THE MANUFACTURE OF KETENE
Filed Jan. 5, 1937   2 Sheets-Sheet 2
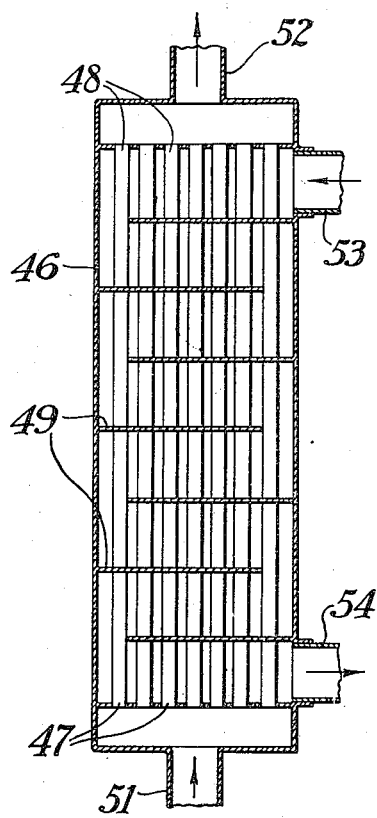
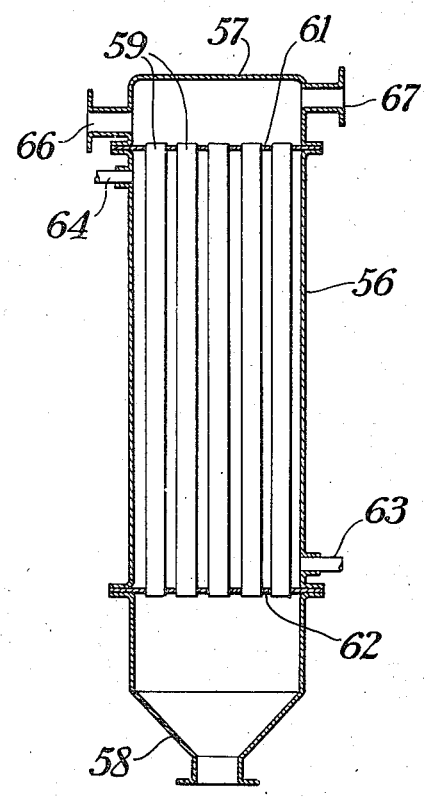
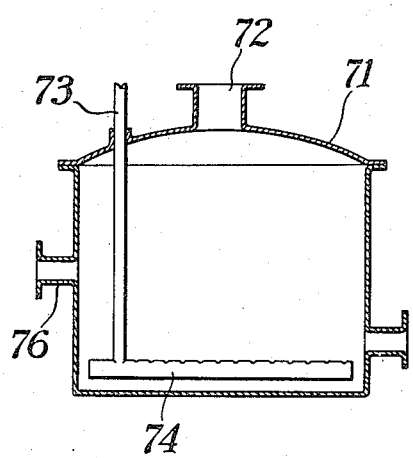
Frederick J. Hopkinson
INVENTOR.

Patented Oct. 14, 1941

2,258,985

UNITED STATES PATENT OFFICE 2,258,985

PROCESS FOR THE MANUFACTURE OF KETENE

Frederick J. Hopkinson, Rochester, N. Y., assignor to Eastman Kodak Company, Rochester, N. Y., a corporation of New Jersey Application January 5, 1937, Serial No. 119,087

5 Claims. (Cl. 260—550)

This invention relates to pyrolysis and more particularly to the pyrolysis of ketenizable materials, such as acetone, to obtain ketene.

The manufacture of ketene is described in a number of patents and publications. As is well-known, ketene is quite reactive and tends to polymerize under certain circumstances. Prior art describes the production of ketene by the pyrolysis of acetone and other ketenizable substances. The early disclosures such as "Journal of the American Chemical Society" 45 p. 515, 1923, show the production of ketene followed by passage of the ketene directly into a condenser. However, more recent work describes immediately passing the ketene materials into an absorbing medium which is reactive with respect to ketene. Other references describe passing ketene materials into the usual type heat exchanger. Other recent work describes passing the products including ketene into contact with a liquid cooling medium which is non-reactive with ketene and then passing the cooled ketene into contact with a reactive medium. Still other references describe cooling the ketene-containing vapors by means of water cooling, followed by treatment in an upright column. Hence, it is readily apparent that the production, separation, and recovery of ketene are still problems of some magnitude which have not been satisfactorily solved.

I have found a novel method of producing and separating ketene which is highly efficient, together with a method of utilizing the ketene produced.

This invention has for one object to provide a process for producing ketene from ketenizable substances. Another object is to provide a process for the separation of ketene which includes cooling. Still another object is to provide a process for separating ketene wherein the ketene-containing materials may not be subjected to too great a cooling. Still another object is to provide a process for the separation and recovery of ketene-containing materials which is efficient and unaccompanied by substantial losses. Still another object is to provide a process for the production and separation of ketene-containing materials which is continuous. A still further object is to provide a process for the utilization of ketene materials. Other objects will appear hereinafter.

These objects are accomplished by my novel method and apparatus arrangement wherein a ketenizable substance is pyrolyzed to produce ketene which is at least partially cooled by passing in heat transfer relationship with predetermined and controlled weights of the vapors of a ketonizable material but out of direct admixture with the pyrolysis products. The partially cooled ketene is then subjected to a reflux and absorption treatment. For a more complete understanding of my invention, reference is made to the attached drawings.

Figure 2:
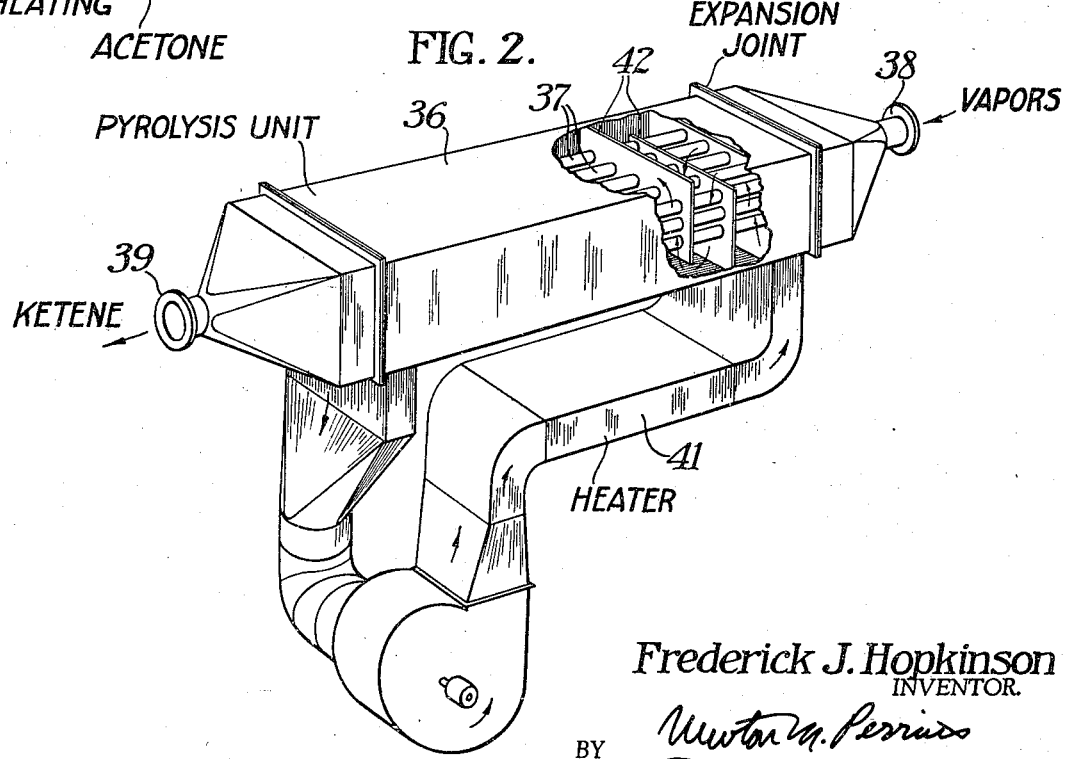

Fig. 1 is a semi-diagrammatic side elevation view in the nature of a flow sheet showing one arrangement of apparatus for carrying out my invention. Fig. 2 is a semi-diagrammatic side elevation view showing the reactor or pyrolysis means that may be employed in my apparatus arrangement. Fig. 3 is a semi-diagrammatic side elevation view of a type of heat transmitter unit that may be employed in my apparatus set-up. Fig. 4 is a side elevation view showing in large scale condensers and coolers that may be used in my apparatus set-up. Fig. 5 is a detailed section of an absorber such as may be used in my apparatus set-up.

In Fig. 1, 2 represents a still or base heater for the ketenizable substance to be treated. This still is connected by means of a conduit 3 to a reactor or pyrolysis unit, while of any standard construction, is preferably constructed as 4. This unit is shown in detail in Fig. 2. However, it is to be pointed out that preferably a unit will be provided wherein the temperature may be graduated, as shown.

This reactor is connected by conduit 6 to the cooling device 7. The particular construction of the unit is not a limitation upon my invention excepting that the unit should be one wherein the ketone-containing vapors will be cooled by contact with cooling material in vapor phase and in heat transfer relationship therewith, but out of direct admixture with ketene. Detailed description of a type of cooling device that is satisfactory will be had under Fig. 3. The cooling device is connected by conduits 8 and 9 to a column 11. A valved branch conduit 12 may be provided.

Conduit 9 preferably leads to some intermediate portion of column 11. This column may be of any usual construction or may comprise a packed section. The lower portion of the column terminates in the still section 13 which includes the heating coils 14. Still 13 is connected by the trapped overflow 16 to base heater 2.

The upper portion of the column includes a condenser section 17, which may be as shown for a small unit, or as an alternative for a large unit, an illustrative suitable section being disclosed in further detail in Fig. 4. The upper section of column 11 also includes an inlet conduit 18 for feed to the system. Also, an outlet conduit 19 is provided for withdrawing the non-condensibles to the absorption apparatus 21, 22. Suitable construction for absorption equipment is shown in further detail in Fig. 5. The upper portion of absorber 21 may be provided with a condenser 23 which may be the same as condenser 17. The upper portion of condenser 23 may be provided with the outlet 24 which leads to absorber 22. The lower portion of absorbers 21 and 22 are connected by means of conduit 26.

Absorber 21 is provided with the outlet 27 which leads through condenser 28 to receiver, storage or other use. Absorber 22 is provided with an inlet 29 for acetic acid. This absorber is also provided with an outlet for gases 31 which leads to unit 32. This device may be a silica gel absorber, for example. Or, if the gases are to be used for heating, it may be a water scrubber. The gases from this point may be returned through conduit 33 to pyrolysis tube 4 heating arrangement.

Reference is now made to Fig. 2. The reactor there shown represents one type which may be used at 4 in my apparatus set-up. This unit comprises the shell 36 which contains a battery or nest of tubes 37. The material to be pyrolyzed is introduced at 38 and withdrawn at 39. The tubes may be heated to pyrolysis temperature by means of blowing or otherwise circulating the heating fluid over the heater 41 and then into contact with the tubes. It will be noted that baffle means have been included at 42 so that the temperature therein may be graduated. That is, the temperature in one portion of the unit may be at 500° or 600° C. and in another portion or unit at 600° or 700° C. This is accomplished by means of delaying the heating fluids by baffles or other construction in contact with the tube for a longer period.

The tubes 37 in my apparatus, as already indicated, may comprise various material such as copper, silver or they may be of a composite structure having one type of metal liner and a heat-resisting agent jacket.

Reference is now made to Fig. 3, which represents an apparatus unit which might be inserted at 7, for example. One or more of these units as may be necessary can be employed. This unit comprises an external shell 46 which includes a nest of tubes or other passages 47. These conduits would be fastened in the apparatus by means of a tube sheet 48 or other usual construction. The apparatus may also include baffles 49 or other means for deflecting vapors and further supporting the conduits. Ketene-containing vapors may be fed in at 53 and withdrawn at 54. Acetone vapors may be fed in at 51 and withdrawn at 52.

Fig. 4 shows one type of cooling unit that may be employed at 17, 23 and at other points in my apparatus arrangement. This unit comprises the enclosed chamber 56 having a header 57 and a bottom inlet 58. This unit includes a nest of passages 59 fastened in tube sheets 61, 62. Cooling fluid may be introduced at 63 and withdrawn at 64. Uncondensibles may be withdrawn at 66. Ketone may be fed through the inlet conduit 67, if desired.

In Fig. 5 disclosure is set forth respecting one type of absorber unit which may be employed in my apparatus set-up at 21 and 22. In place of this unit, plate or packed absorbing towers may be substituted. In the unit of Fig. 5 an enclosed still pot is provided at 71. The still pot has an outlet 72 which leads to condenser 23 as shown in Fig. 1. Conduit 73 corresponds to conduit 18 of Fig. 1 and terminates in a perforated distributor 74. An overflow conduit is provided at 76.

In all of the various processes for ketene production usually best results are obtained by converting only a part of the ketenizable material per pass. That is, in the case of the pyrolysis of acetone, for example, for best yields only about one-third to one-twentieth of the acetone feed would be converted to ketene per pass. This is not objectionable, providing the unconverted materials are reutilized. In ketene processes, high temperatures, say between 500° and 1000° C. may be used. This means that by pyrolyzing only a portion of the ketone a large surplus of ketone or other material is being heated to a high temperature and then in the ketene separation this unpyrolyzed surplus is cooled. As already pointed out, many processes recommend cooling by acetone spray or passing through water coolers. While such procedure cools the ketene and permits separation, a cold acetone wash, for example, will absorb some ketene and such procedure unmodified reduces the efficiency of the process substantially.

By using my novel process and apparatus a number of the disadvantages of prior art processes have been overcome. For a more complete understanding of my invention, reference is made to the following example described with particular reference to Fig. 1. This example is set forth particularly for illustrating my preferred embodiment and it is to be understood that my invention is not to be restricted thereto.

Acetone or other ketenizable material to be pyrolyzed is fed into still 2 as will be pointed out hereinafter. This ketone material is vaporized and passed through conduit 3 into the pyrolysis apparatus 4. According to my process, only a fraction of the acetone or other material, say about one-fifth to one-twelfth of the material, fed into 4 will be pyrolyzed per pass. The pyrolysis step is carried out to a large extent by the procedure described in Clarke and Waring U. S. Patent 1,723,724. The time of passing through the reaction chamber is generally less than 5 seconds and in some instances only comprises a fraction of a second. The pyrolysis chamber will be heated between 500–900° C., about 700–800° C. being particularly satisfactory. This heating may be graduated, namely, the temperature at the entrance and exit may be slightly lower than that at the portion of the pyrolysis chamber where the decomposition takes place. The pyrolysis tubes may be of copper, silver, composite tubes or various chrome steels containing 15–40% chrome together with small amounts of aluminum, silica and the like. The presence of free iron and nickel, as pointed out in Clarke and Waring Patent 1,723,724 is to be avoided in the reaction zone.

The vapors issuing through conduit 6, for example, and at the temperature of 600–700° C., are cooled by acetone vapors in cooler 7. This type of cooling will remove sufficient heat from the ketene vapors to reduce their temperature sufficiently that losses by polymerization will be minimized. Also, by my novel method of at least partially cooling the unreacted ketone, too low a cooling is prevented at this stage of the process. For example, cooling with water or brine might reduce the temperature to such an extent that unreacted acetone would be precipitated, which acetone would tend to dissolve ketene. By my arrangement for partially cooling, this is guarded against because by cooling as I have shown, it is impossible to reduce the temperature of the vapors to such an extent that unreacted acetone will be precipitated. In addition, by my procedure a large excess of acetone may be passed through the pyrolysis apparatus without the disadvantages of loss of efficiency in the process due to heat wasted by heating up this excess and subsequent cooling thereof. The partially cooled ketene may be further cooled by passage through conduit 12. By my method the ketene-containing vapors are reduced in temperature from, for example, 600–700° C. to around 70° C. In any event, in the example under consideration, the ketene vapors would not be reduced below about 56° C. Inasmuch as these temperatures, 56–70° C. are above the boiling point of acetone, the solubility of ketene in acetone is, of course, at a low figure. On the other hand, the temperature has been sufficiently reduced so that heat action on the ketene which has been formed is also at a low figure.

The partially cooled ketene-containing vapors are then conducted through 9 into an intermediate part of column 11. Acetone fed to my system may be introduced through 18. This feed together with condenser 17 will cause a separation of the ketene-containing vapors from condensible materials therein, such as unreacted acetone. While the acetone feed may dissolve some ketene, this is not objectionable in my process because the boiling acetone vapors will scrub out the ketene from the liquid acetone. Any ketene therein is driven off and passed through conduit 19 to the absorber system. The heated acetone in 13 may be continuously conducted through conduit 16 to still pot 2, where it is passed through the system and pyrolyzed. If desired, somewhere along the line 16 means may be included for purifying or otherwise treating the acetone.

The ketene-containing materials leaving at 19 may be passed through absorbers 21, 22 containing acetic acid, propionic acid or other material. These acids would be fed in at 29 and cause the production of anhydride which may be withdrawn through 27, cooled at 28 and passed to storage or other use. The unabsorbed materials which comprise to a large extent combustible gases may be led through 31 into a silica gel, carbon, aluminum gel or other type absorber which removes any absorbable material such as acetone and aliphatic acid. The gases leaving the absorber at 33 may be conducted to the pyrolysis apparatus 4 to be used in the heating thereof.

By means of my process, I am able to obtain highly efficient results by pyrolyzing only a part of the acetone feed per pass. The fact that by my process a large excess of acetone over that converted is heated does not possess the disadvantages of prior art processes, inasmuch as I have provided procedure wherein this heat may be more or less continuously recovered. By my method the ketene vapors may be simply and properly cooled to the best temperature without danger of over-cooling. While I have provided a procedure for scrubbing ketene with acetone in my process, this is without disadvantage because the loss of ketene by solution in the scrubbing liquid is taken care of to a substantial extent. In my process the acetic, propionic or butyric acids contained in absorbers 21 and 22 would be maintained preferably around 70–90° C. In addition, these absorbing liquids may contain catalysts such as sulfuric acid or other agents yielding the sulfate ion, hydrochloric acid or other agents which will liberate the chloride ion.

From the above it is apparent that my invention is susceptible to some modification. Hence, I do not wish to be restricted excepting as is necessitated by the prior art and the spirit of the appended claims.

What I claim and desire to secure by Letters Patent of the United States is:

1. A process for the pyrolysis of acetone to ketene which comprises passing a quantity of acetone to heating between 500° C. and 1000° C., converting only one-twentieth to one-third of the acetone per pass to ketene, said heating being graduated so that the heating at the start and toward the completion thereof is lower than at an intermediate point, cooling said ketene in the presence of the large excess of unconverted acetone and any other components in the reaction mixture, by countercurrent passage in heat transfer relationship with acetone vapors out of direct admixture with the ketene, thereby preventing overcooling of the ketene-containing reaction mixture, further cooling the partially cooled ketene-containing materials by contact with liquid acetone in heat transfer relationship but also out of direct admixture therewith, further cooling the partially cooled ketene-containing mixture to cause the precipitation of acetone in admixture with the ketene and thereby permitting the separation of the ketene, immediately heating the acetone-liquid that is precipitated to drive off any ketene dissolved therein, passing the ketene so separated by the foregoing steps into contact with a lower aliphatic acid and contacting the unabsorbed effluent vapors from this latter step with an absorbent.

2. A process for the pyrolysis of acetone to ketene which comprises passing a quantity of acetone to heating between 600° C. and 1000° C., converting only a small fraction of the acetone per pass to ketene, cooling said ketene in the presence of the large excess of unconverted acetone and other components of the reaction mixture, by passage in heat transfer relationship with acetone vapors out of direct admixture with the ketene, thereby preventing overcooling of the ketene-containing reaction mixture, further cooling the partially cooled ketene-containing materials by contact with liquid acetone in heat transfere relationship therewith but also out of direct admixture, further cooling the ketene-containing mixture to cause the condensation of said unconverted acetone in admixture with the ketene thereby permitting the separation of ketene, immediately heating the acetone that is condensed to drive off any ketene dissolved therein and supplying this heated acetone to the aforementioned step of the process of cooling with liquid acetone.

3. A process for the pyrolysis of a ketenizable substance to ketene which comprises passing a quantity thereof to heating between 500° C. and 1000° C., converting only one-twentieth to one-third of the substance per pass to ketene, said heating being graduated, by baffled contact with heating gases, so that the heating at the start and toward the completion thereof is lower than at an intermediate point, cooling said ketene in the presence of the unconverted substance by countercurrent passage in heat transfer relationship with vapors of ketenizable substance having a boiling point not substantially greater than the boiling point of said unconverted substance, out of direct admixture with the ketene, thereby preventing overcooling of the ketene-containing reaction mixture, further cooling the ketene-containing mixture to cause the condensation of the ketenizable substance in admixture with the ketene, thereby permitting the separation of the ketene and immediately heating the liquid that is condensed to drive off any ketene dissolved therein.

4. A process for the pyrolysis of acetone to ketene which comprises passing a quantity of acetone to heating between 500° C. and 1000° C., converting only a small fraction of the acetone per pass to ketene, cooling said ketene in the presence of the unconverted acetone, by countercurrent passage in heat transfer relationship with acetone vapors out of direct admixture with the ketene, thereby preventing overcooling of the ketene-containing reaction mixture, further cooling the partially cooled ketene-containing materials by indirect contact with liquid acetone in heat transfer relationship but out of direct admixture therewith, further cooling the ketene-containing mixture to cause the precipitation of unconverted acetone in admixture with the ketene, thereby permitting the separation of the ketene and immediately heating the liquid that is precipitated to drive off any ketene dissolved therein.

5. A process for the pyrolysis of a ketenizable ketone to ketene which comprises passing a quantity of the ketone to heating between 500° C. and 1000° C., converting only a small fraction of the ketone per pass to ketene, said heating being graduated within the aforementioned temperature range by baffled contact with the heating gases, cooling the ketene resulting from the heating in the presence of unconverted ketone and any other components in the reaction mixture, by passage in heat transfer relationship with vapors of said ketenizable ketone out of direct admixture with the ketene, thereby preventing overcooling of the ketene-containing reaction mixture, further cooling the partially cooled ketene-containing materials by said ketenizable ketone in liquid phase and heat transfer relationship therewith but out of direct admixture with the partially cooled ketene-containing reaction mixture, further cooling the ketene-containing mixture to cause the condensation of unconverted ketone in admixture with the ketene, thereby permitting the separation of the ketene, immediately heating the liquid that is condensed to drive off ketene dissolved therein, and supplying this heated ketone to the aforementioned step of the process, of cooling with ketone in liquid phase.

FREDERICK J. HOPKINSON.